(12) United States Patent
Berls et al.

(10) Patent No.: US 9,305,182 B1
(45) Date of Patent: Apr. 5, 2016

(54) MANAGING DISTRIBUTION OF SENSITIVE INFORMATION

(75) Inventors: C. Erik Berls, San Jose, CA (US); Ryan Donald Lackey, Seattle, WA (US); Tom Gunnar Sparks, San Francisco, CA (US)

(73) Assignee: CLOUDFLARE, INC., San Francisco, CA (US)

( * ) Notice: Subject to any disclaimer, the term of this patent is extended or adjusted under 35 U.S.C. 154(b) by 0 days.

(21) Appl. No.: 13/215,060

(22) Filed: Aug. 22, 2011

(51) Int. Cl.
*G06F 21/00* (2013.01)
*G06F 21/62* (2013.01)
*H04L 29/06* (2006.01)

(52) U.S. Cl.
CPC .............. *G06F 21/629* (2013.01); *H04L 63/08* (2013.01)

(58) Field of Classification Search
CPC ....... G06F 21/629; G06F 21/53; G06F 21/31; G06F 2009/45575; H04L 63/08
USPC .......................................................... 713/168
See application file for complete search history.

(56) References Cited

U.S. PATENT DOCUMENTS

| 5,838,903 | A  | * | 11/1998 | Blakely et al. ..................... 726/5 |
| 6,092,202 | A  | * | 7/2000  | Veil et al. ......................... 726/27 |
| 7,065,637 | B1 | * | 6/2006  | Nanja ................................ 713/1 |
| 2007/0198830 | A1 | * | 8/2007 | Imai ............................. 713/156 |
| 2009/0282266 | A1 | * | 11/2009 | Fries et al. ..................... 713/193 |
| 2010/0049968 | A1 | * | 2/2010 | Dimitrakos et al. .......... 713/153 |
| 2012/0084570 | A1 | * | 4/2012 | Kuzin et al. ................... 713/182 |

OTHER PUBLICATIONS

Gordon McKinney, "RFC 793", Feb. 23, 2002.*
Gu, P., Shang, Y., Chen, J., Deng, M., Lin, B., & Li, C. (Jul. 2011). ECB: Enterprise Cloud Bus Based on WS-Notification and Cloud Queue Model. In Services (SERVICES), 2011 IEEE World Congress on (pp. 240-246). IEEE.*
OASIS Technical Committee. Web Services base notification 1.3—http://docs.oasis-open.org/wsn/wsn-ws_base_notification-1.3-specos.pdf, 2006.*

(Continued)

*Primary Examiner* — Syed Zaidi
(74) *Attorney, Agent, or Firm* — Nicholson De Vos Webster & Elliot, LLP

(57) ABSTRACT

Managing distribution of sensitive data is disclosed. In one example, a request is sent to a control platform to add a virtual domain. A domain key associated with the virtual domain is received. A request that the credential be transmitted to the virtual domain is sent, along with the application credential which has been encrypted using the domain key. In another example, a request that one or more application credentials be pushed to a virtual domain is received from a configuration console. The virtual domain is notified that at least one action request associated with the virtual domain is available. A signed request is received from the virtual domain for the action request. The application credentials are transmitted to the virtual domain. In a third example, an application credential of a virtual domain is requested. A signed message including an encrypted application credential is received from the control platform.

19 Claims, 7 Drawing Sheets

(56) References Cited

OTHER PUBLICATIONS

OASIS Technical Committee. Web Services brokered notification 1.3—http://docs.oasis-open.org/wsn/wsn-ws_brokered_notification-1.3-spec-os.pdf, 2006.*

Krsul, I., Ganguly, A., Zhang, J., Fortes, J. A., & Figueiredo, R. J. (Nov. 2004). Vmplants Providing and managing virtual machine execution environments for grid computing. In Supercomputing, 2004. Proceedings of the ACM/IEEE SC2004 Conference (pp. 7-7). IEEE.*

* cited by examiner

CRYPTO SEAL – ACME COMPANY – STATUS OF REQUEST(S) | Sign Out

Here is the status of your requested changes:

DOMAIN: DBSERVER2
- ☑ DB Password — 702
- ☑ SSL Certificate — 704

DOMAIN: DBSERVER1
- ☐ DB Password ...AWAITING RESPONSE — 706

MANAGING DISTRIBUTION OF SENSITIVE INFORMATION

BACKGROUND OF THE INVENTION

Businesses and other entities increasingly use infrastructure-as-a-service (IaaS) vendors to provide hosted computing resources instead of purchasing and maintaining computer hardware themselves. Unfortunately, without physical control over physical hardware, security and other problems can arise. As one example, newly provisioned virtual domains are particularly vulnerable to compromise by nefarious individuals until such time as the owner of the domain is able to access the domain and configure it correctly. As another example, multiple customers may make use of the same configuration server when configuring their respective virtual domains. The configuration server is a single point of compromise that can include high value assets such as cleartext password information for the various domains it supports. A nefarious individual can extract sensitive information out of the configuration server by directly attacking it, and also by impersonating a domain and asking for its configuration information.

BRIEF DESCRIPTION OF THE DRAWINGS

Various embodiments of the invention are disclosed in the following detailed description and the accompanying drawings.

FIG. 7 illustrates an embodiment of an interface to a control platform as rendered in a browser.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
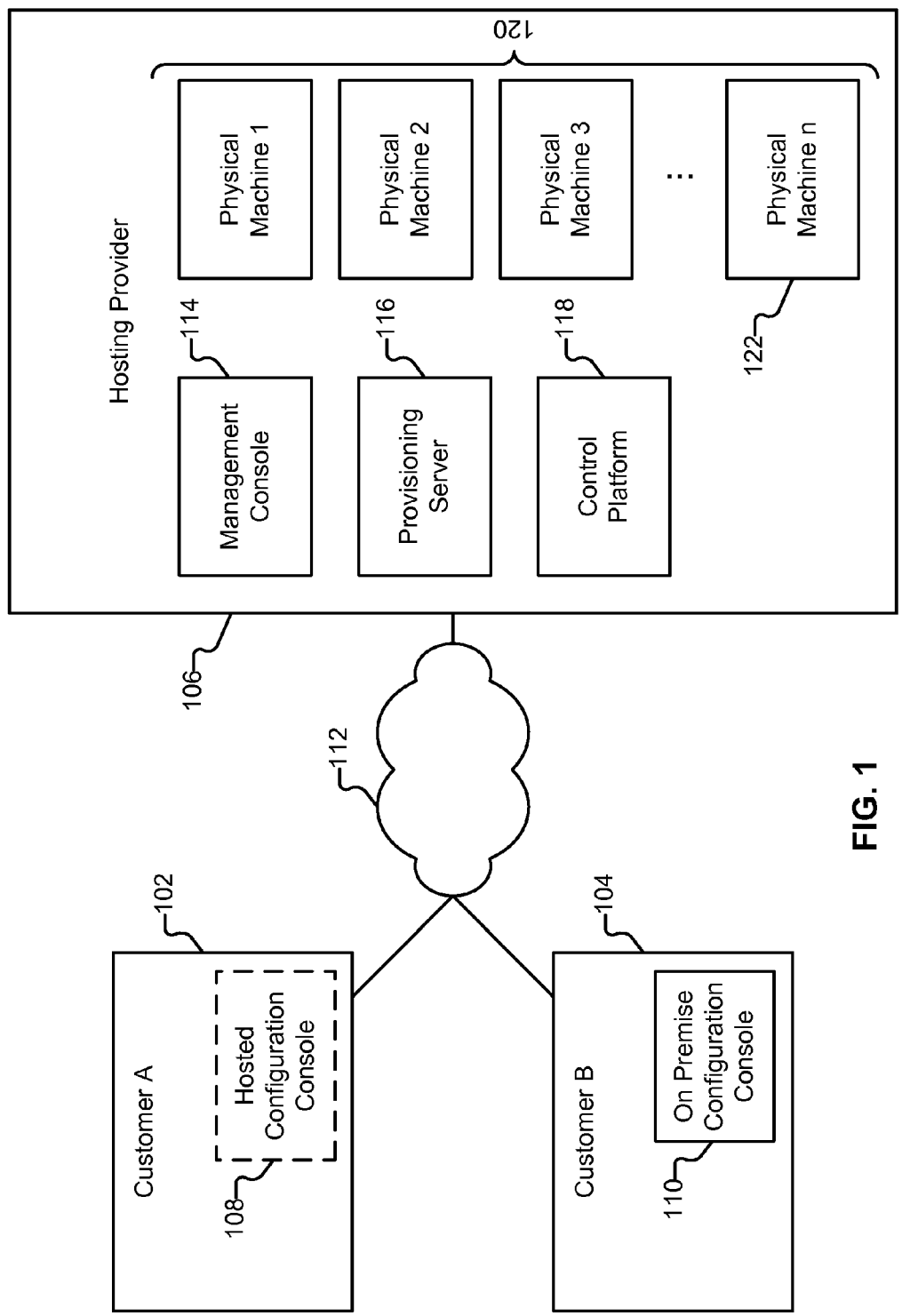
FIG. 1 illustrates an environment in which data, including sensitive data, is securely distributed.

FIG. 1 illustrates an environment in which data, including sensitive data, is securely distributed. In the example shown, Customer A (also referred to herein as ACME Insurance Company) is a regional insurance company that maintains an enterprise network 102. ACME also has a virtualized database server and a virtualized web server that are hosted by hosting provider 106. Customer B (also referred to herein as Beta Corporation) maintains an enterprise network 104. Beta is a developer of large enterprise applications and makes use of multiple hosting providers, including hosting provider 106.

Customers of hosting provider 106 use management console 114 to create and manage virtual servers (also referred to as "guest domains" and "virtual domains"). For example, as ACME's customer base grows in size, an administrator at ACME can increase the number of ACME's virtual servers as needed by interacting with management console 114 via an interface. When a new virtual server is needed, provisioning server 116 is responsible for selecting an appropriate physical machine from a pool 120 and loading the applicable image/software. Using the techniques described herein, sensitive configuration and other information, such as SSH and other cryptographic keys; SSL and other certificates; and static passwords, can be pushed to the new virtual server in a secure manner. Such credentials are collectively referred to herein as "application credentials."

As will be described in more detail below, control platform 118 is configured to facilitate the secure distribution of sensitive information. The control server is also configured to facilitate the updating of such sensitive information, and to perform other tasks, as applicable.

Whenever control platform 118 is described as performing a task, either a single component, all components, or a subset of all components of control platform 118 may cooperate to perform the task. Similarly, whenever a component of control platform 118 is described as performing a task, a subcomponent may perform the task and/or the component may perform the task in conjunction with other components. In some embodiments, the functionality of control platform 118 or portions thereof is provided by provisioning server 116, management console 114, and/or other infrastructure under the control of the owner of hosting provider 106. In such scenarios, a separate control platform 118 may be omitted.

The functionality of control platform 118 can also be provided by a third party. As one example, in some embodiments hosting provider 106 contracts with an owner of control platform 118 to provide services to hosting provider 106's customers. As another example, in some embodiments control server 118 is owned (or leased) by ACME or Beta. As yet another example, in some embodiments control platform 118 is under the control of a government entity or a consultancy that provides Payment Card Industry Data Security Standard (PCI DSS), Health Insurance Portability and Accountability Act (HIPAA), or other compliance-related services.

In the example shown, each of the physical machines in pool 120 includes standard commercially available server hardware (e.g., a multi-core processor, 4+ Gigabytes of RAM, and one or more Gigabit network interface adapters). Additional hardware may also be included in a physical machine, such as a trusted platform module (TPM) chip and/or a USB dongle. Further, machines in pool 120 are configured in various embodiments to run commercially available virtualization software, such as VMware ESXi, Citrix XenServer, or Microsoft Hyper-V. An arbitrary physical machine 122 in the pool can be configured to host guest domains of a single entity or configured to support the guest domains of multiple tenants, as applicable.

As illustrated in FIG. 1, control platform 118 is a single device, running MySQL and Apache Tomcat. Other hosting providers have respective other control platforms and, depending on size, may use multiple instances of MySQL and/or a cluster of Apache Tomcat frontends. Other database and web frontend software may also be used, as applicable. In some embodiments the functionality of control platform 118 is provided by a global "server" implemented as a scalable, elastic architecture and may comprise several distributed components, including components provided by one or more third parties.

Enrollment

Figure 2:
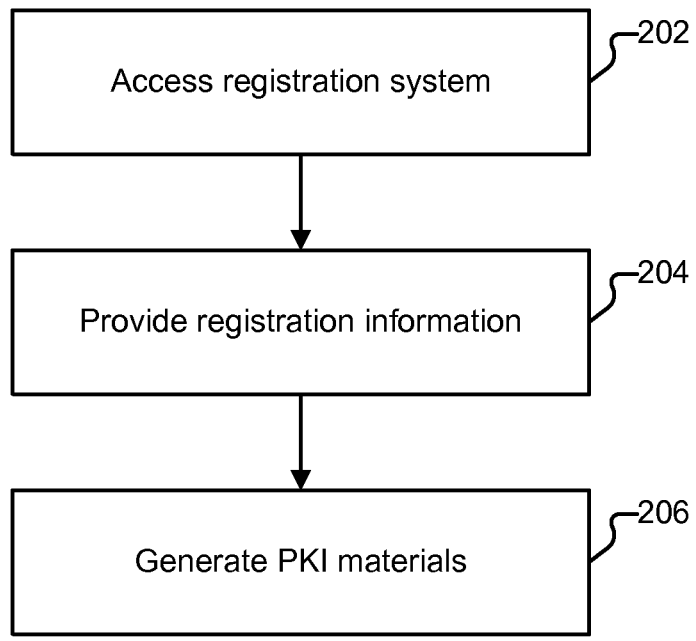
FIG. 2 illustrates an embodiment of a process for enrolling with a control server.

FIG. 2 illustrates an embodiment of a process for enrolling with a control server. In some embodiments the process shown in FIG. 2 is performed by a customer (e.g., an administrator of network 102 or network 104). The process begins at 202 when the enrollee accesses a registration system. As one example, the enrollee directs a web browser to a web interface provided by control platform 118. At 204, the enrollee provides registration information, such as an email address and password. The registration information may be selected by the enrollee at 204, and may also be predetermined, such as by an administrator of control platform 118.

Once the registration information has been approved (e.g., after the provided email address has been verified, and/or other checks have been performed), a digital identify certificate is created for the customer (206). Specifically, the enrollee is asked to generate a certificate signing request and provide it to a certificate authority (e.g., included in control platform 118). In response, the enrollee receives back a signed identity certificate. The enrollee's registration/certificate information is stored in database 314.

Portions of the process shown in FIG. 2 may be omitted or modified, as applicable. For example, in some embodiments instead of selecting registration information and supplying it at 204, the enrollee's registration information is provided to control platform 118 by an administrator of control platform 118 and communicated to the enrollee in conjunction with the signing of a contract or otherwise delivered independently of the process shown in FIG. 2. As another example, portion 206 of the process can be performed independently of the rest of the process shown in FIG. 2, and/or may be performed with an entity other than control platform 118 (e.g., a separate certificate authority), with the appropriate certificate information communicated to control platform 118, as applicable.

Figure 3:
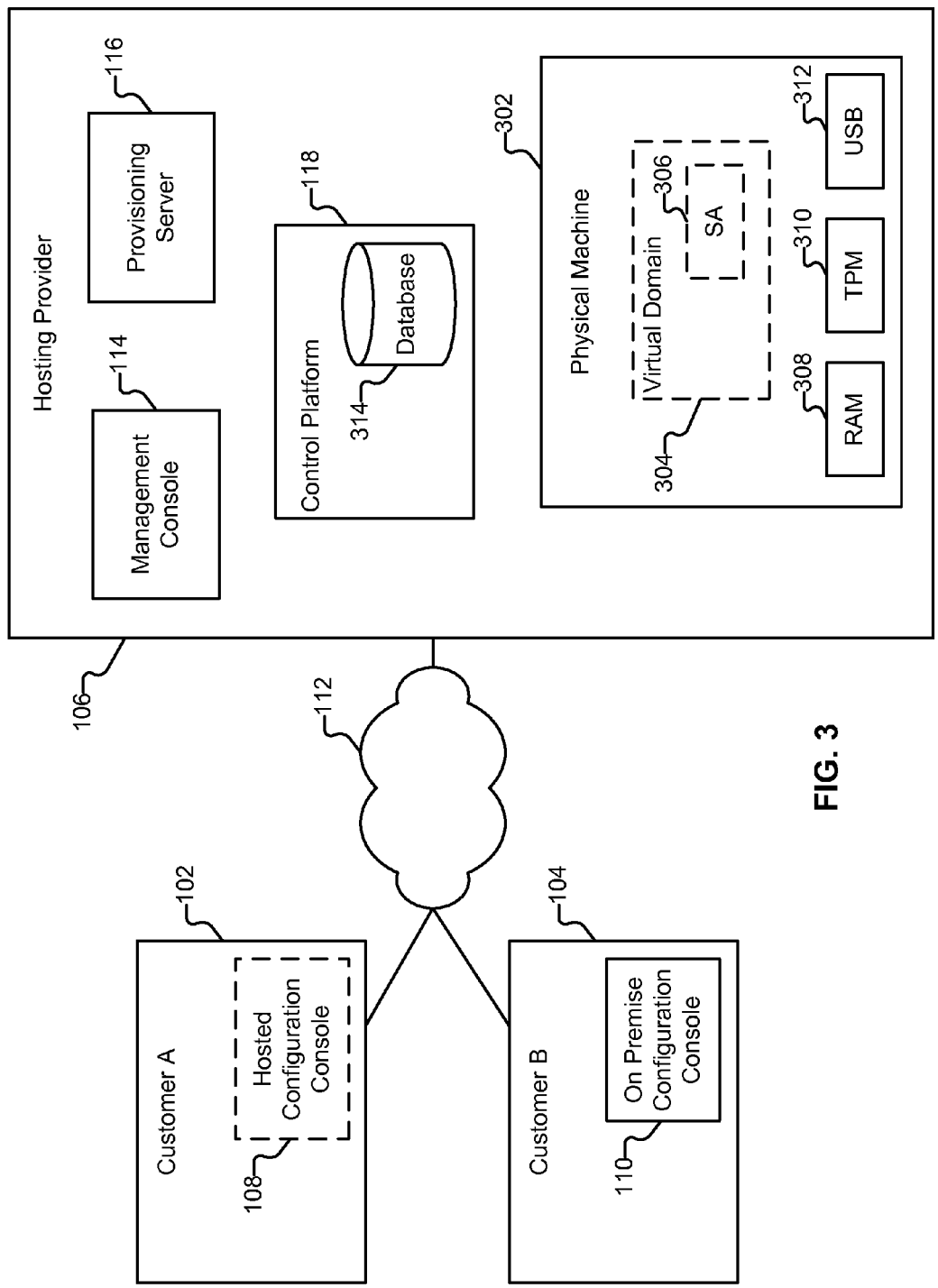
FIG. 3 illustrates additional details of components included in the environment shown in FIG. 1.

FIG. 3 illustrates additional details of components included in the environment shown in FIG. 1. The components will be described in conjunction with the creation and ongoing maintenance of a virtual domain.

Activating a New Virtual Domain

In the following discussion, "Alice" is an administrator of network 102 and "Bob" is an administrator of network 104. Alice and Bob communicate with control platform 118 through respective configuration consoles 108 and 110, via network 112. Alice's company, ACME, has opted to use a hosted configuration console made available by control platform 118 as a web application. Bob's company, Beta, has instead opted to run its own management console, which communicates with control platform 118 via an application programming interface (API). In various embodiments, source code for consoles 108, 110, and for control platform 118 is open to the public, to customers, or otherwise made available to entities such as auditors. Further, control platform 118 or portions of its functionality can be exposed in different ways (e.g., as a graphical interface or a command line interface; via a tablet or smartphone application).

Suppose Alice wishes to create and securely configure a new virtual database server (virtual domain 304). First, she interacts with management console 114 to provision the domain. Stored within provisioning server 116 are various images provided by vendors, customers, and in some embodiments control platform 118 (or an entity in control of control platform 118). Once Alice selects an appropriate image, the provisioning server starts domain 304 on physical machine 302 and provides information such as the IP address of the domain to control platform 118. Control platform 118 creates a record in database 314 for Alice's domain 304.

In some embodiments, included within the image selected by Alice, or added during the provisioning process (e.g., as a package) is a system agent configured to communicate with control platform 118. In other embodiments, the agent is a hardware module or is implemented as a combination of hardware and software. The system agent is also configured to communicate with TPM 310 and USB dongle 312. When domain 304 is first started, a keypair is generated for it by TPM 310. The public key of the domain is transmitted by the system agent to control platform 118, which includes the key in database 314 and also provides it to configuration console 108. In other embodiments (e.g., where the physical machine does not include a TPM), the keypair can be generated on the USB dongle, or in domain 0 (dom0), as applicable. As another example, if domain 304 is hosted on a dedicated physical machine, a keypair of the machine (e.g., generated by TPM 310) may be used as the domain keypair. If domain 304 is hosted in a multi-tenant physical machine, each co-tenant may have its domain keys generated by and stored by USB dongle 312, or may have its domain keys generated by and stored by the respective domain (but signed by TPM 310). Other techniques for generating and storing domain keypairs can also be used, as applicable.

Once the domain is online, Alice can securely push credential and other configuration information to it.

Configuring the Virtual Domain

Figure 4:
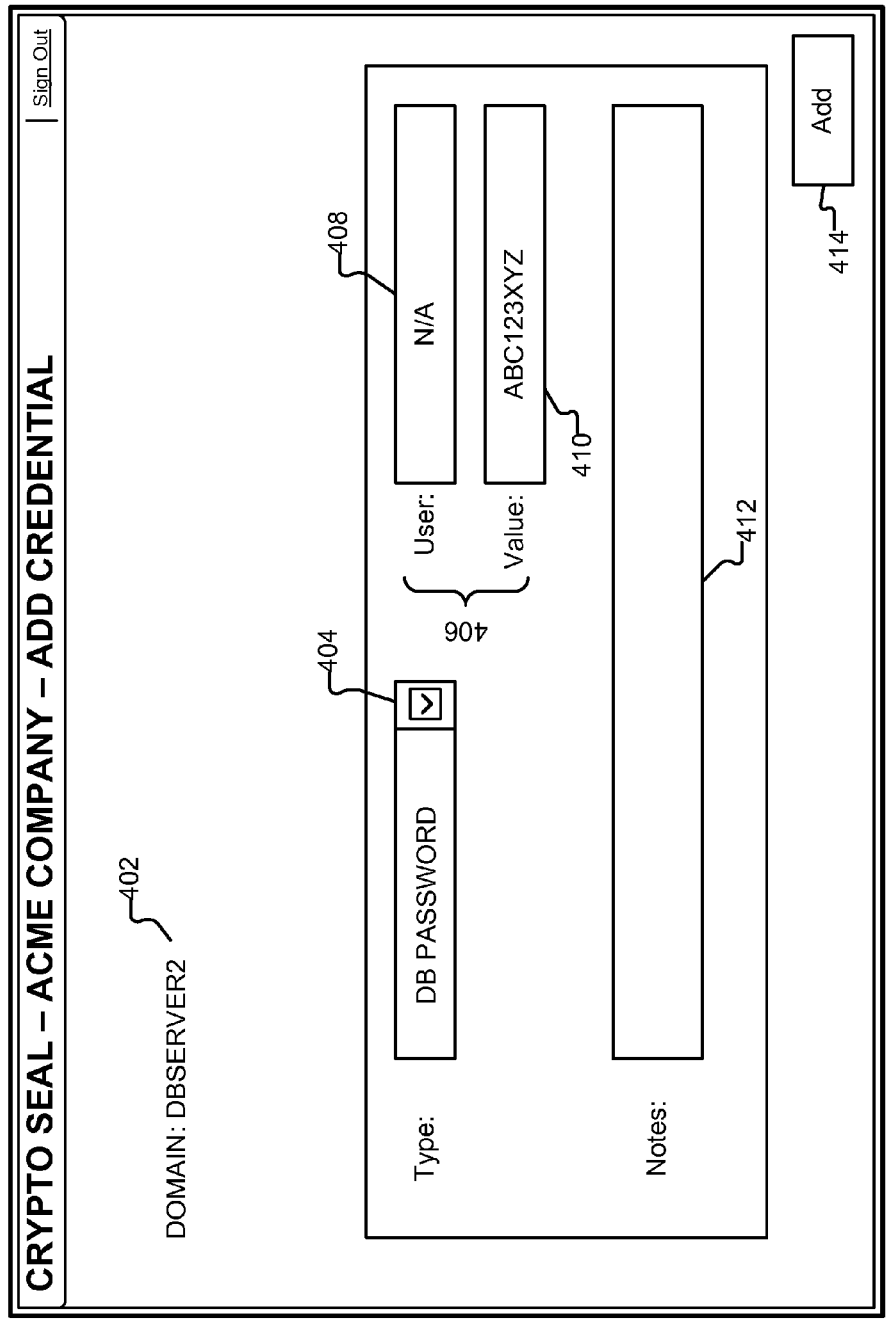
FIG. 4 illustrates an embodiment of an interface to a control platform as rendered in a browser.

FIG. 4 illustrates an embodiment of an interface to control platform 118 as rendered in a browser. In some embodiments, interface 400 and the interface provided by management console 114 are integrated. In the example shown, Alice is presented with interface 400 after logging into configuration console 108 and electing to configure domain 304 (402) from a menu of options. Suppose Alice would like to configure a database password. Control platform 118 includes a library of different types of credentials and other sensitive configuration information. Control platform 118 also includes templates for configuring typical types of systems, such as particular types of database servers, web servers, authentication servers, and so on. Customers can also provide custom templates to control platform 118.

Included in interface 400 is a dropdown list 404 of types of credentials that can be added to domain 304. Alice has elected to add a new database password. Other examples of application credentials that can be added in interface 400 include SSH keys and SSL certificates. Custom credentials can also be entered by selecting a "custom" option from dropdown 404. Based on the type of credential selected, applicable fields 406 will be provided for manipulation by Alice. In the example shown, the database supports a single password and does not have an associated user (408). Alice enters the password into region 410 and can enter any applicable notes into box 412.

When finished, Alice can select the "add" button to transmit the credential information to control platform 118. Specifically, when Alice clicks button 414, the password value will be encrypted using the public key of domain 304 (e.g., obtained from database 314), the complete message (i.e., carrying the information that the credential is to be added to domain 304) will be signed using ACME's digital certificate, and the message will be transmitted to control platform 118. The message can be transmitted using a variety of technologies, including using AJAX, SOAP, and JSON, and is encrypted via SSL. In various embodiments, control platform 118 is configured to store all messages it receives from consoles 108/110 for forensic analysis, rollback, or other purposes. That Alice was the administrator that made the request is also stored.

In addition to creating specific application credentials for specific domains, Alice can also create groups of credentials (e.g., aux users, database administrators), and groups of domains (e.g., database servers) through interfaces similar to interface 400. Such groups are usable to push arbitrary application credentials to arbitrary groups of domains.

When control platform 118 receives the message from Alice, it creates a new entry in the database 314 for the new password including its name, any other parameters, and the password in encrypted form (i.e., encrypted with domain 304's public key). Control platform 118 is configured to verify the signature on the message and also applies any applicable policies stored in database 314. For example, a policy included in database 314 may limit the time of day during which credential information can be modified or may specify that Alice can configure new domains but is not allowed to modify existing configurations.

Alice can continue to add additional credentials using interface 400, and can also update existing credentials (e.g., for the other virtual database server). When finished, she instructs control platform 118 to push the credential information to domain 304.

Pushing Credentials

Figure 5:
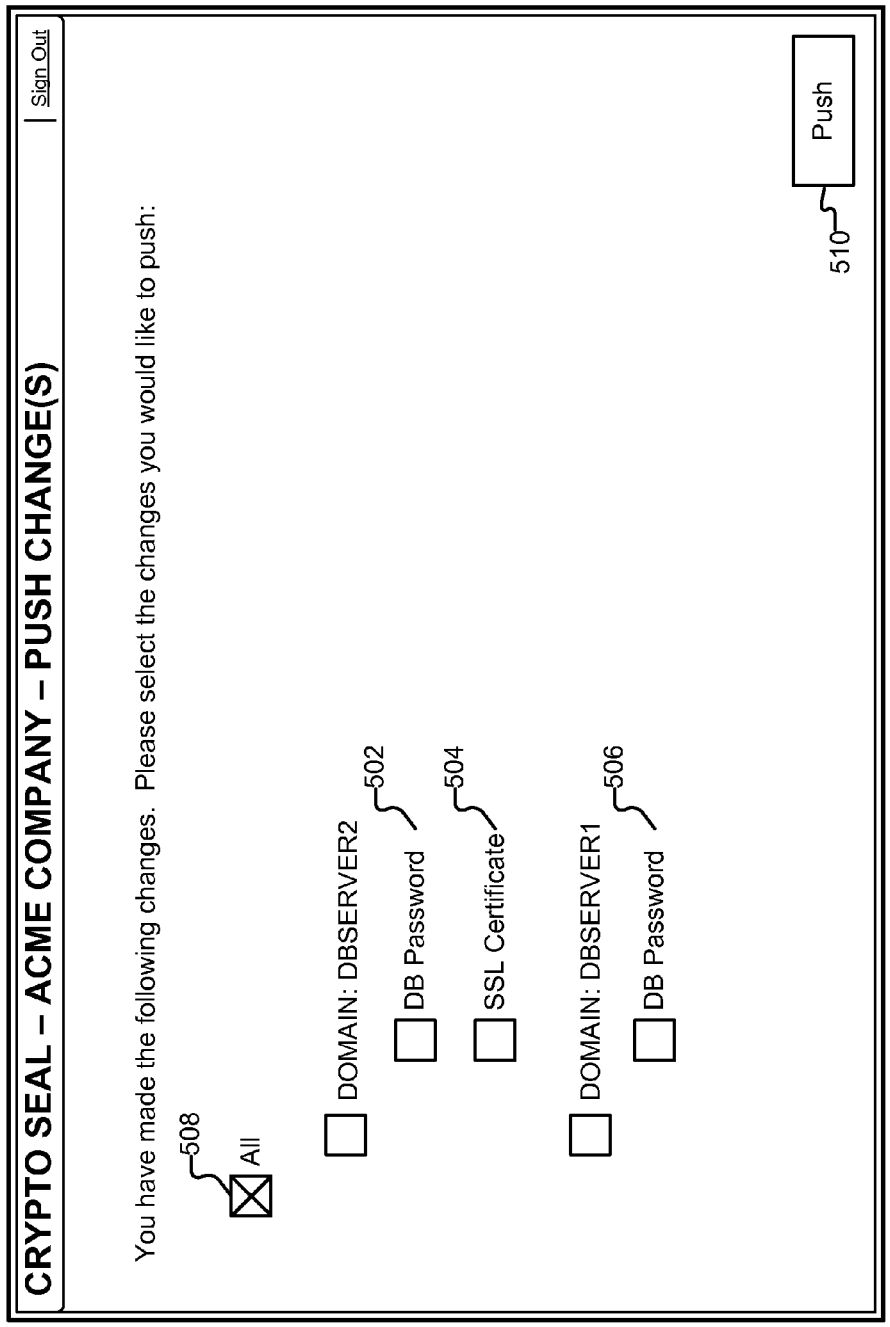
FIG. 5 illustrates an embodiment of an interface to a control platform as rendered in a browser.

FIG. 5 illustrates an embodiment of an interface to control platform 118 as rendered in a browser. Suppose that prior to being presented with interface 500, Alice created a total of two new credentials for new domain 304 (502, 504), and also used an interface similar to that shown in FIG. 4 to update a credential for an existing domain (506). Specifically, Alice decided to change the password of the existing database server to match the password of the newly created database server 304.

Having completed making additions/updates to credential information for the time being, Alice is ready to push the credentials (which have already been stored in database 314) out to the respective domains. As shown in FIG. 5, interface 500 allows Alice to select which credentials to push at this time by selecting one or more applicable checkboxes (508) and then selecting "push" button 510.

Figure 6:
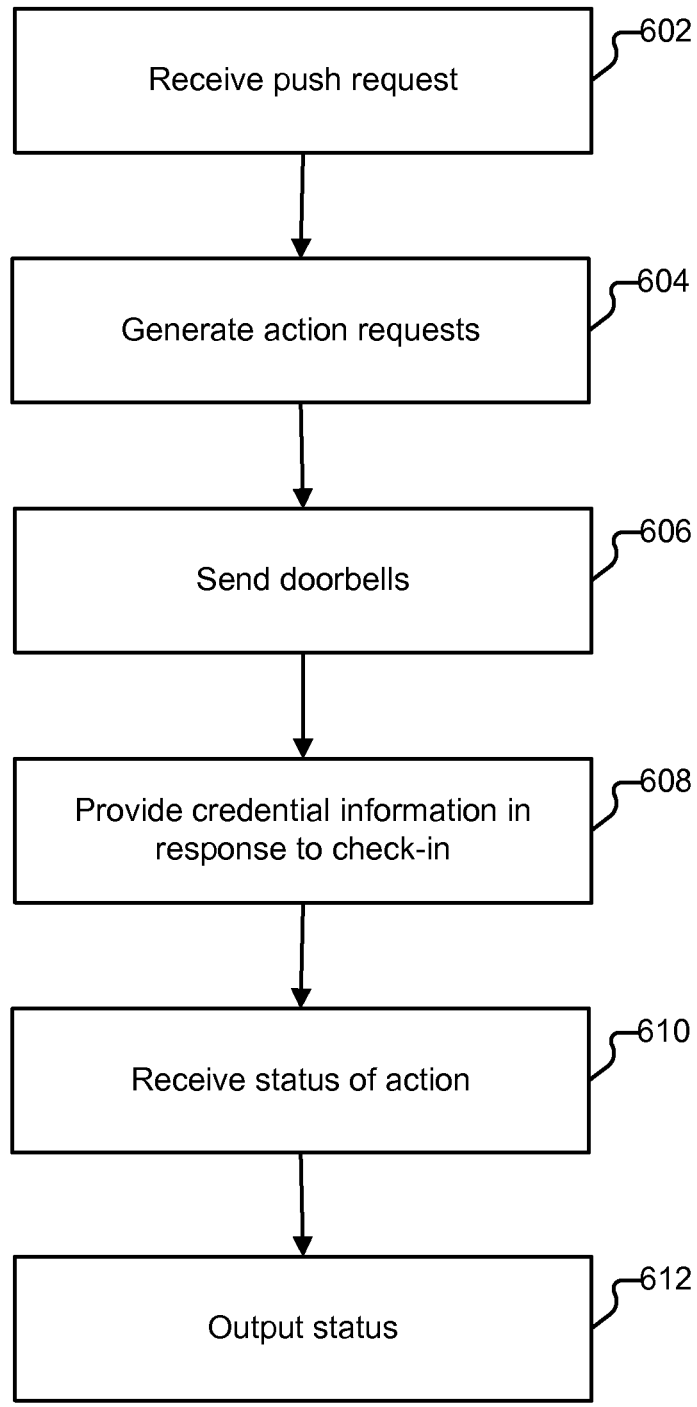
FIG. 6 illustrates an embodiment of a process for pushing credential information.

FIG. 6 illustrates an embodiment of a process for pushing credential information. In some embodiments, process 600 is performed by control platform 118. The process begins at 602 when a request to push credentials is received. As one example, a request is received at 602 when Alice selects button 510. At 604, a set of action requests is generated. An example of an action request is an instruction that a particular domain add (or update) a particular credential. For example, an action request generated with respect to what is illustrated in FIG. 4 is "ACTION: DBSERVER2: ADD DB PASSWORD: <encrypted password>." Action requests that involve the updating of a credential can be either aggregate or atomic. For example, an action request to update an SSH key would be an aggregate, while an action request to update a database password would be atomic.

At 606, a doorbell message is sent to each of the domains for which an action request was generated at 604. A doorbell message is an alert, sent to the agent of a domain, notifying it that one or more action requests are waiting for it at control platform 118. When agent 306 receives a doorbell message (e.g., sent to it at 606), it contacts control platform 118 and asks for any action requests addressed to it via a request signed with the private key of domain 304. In various embodiments, domain 304 is configured to periodically check in with control platform 118 instead of or in addition to responding to doorbell messages sent at 606. Such periodic checks performed by domain 304 are used in some embodiments as sources of heartbeat information by control platform 118.

After verifying the signature, control platform 118 provides agent 306 with two action requests (608)—one to add a database password (502) and one to add an SSL certificate (504). The action requests are signed by control platform 118 (and in some embodiments are also signed by the applicable configuration console). Credentials within the action requests are encrypted using the public key of domain 304. As with messages between configuration consoles 108/110 and control platform 118, messages between control platform 118 and agent 306 can be transmitted using a variety of technologies, including using AJAX, SOAP, and JSON, and are encrypted via SSL. Additional security measures, such as the use of sequence numbers/time to prevent replay attacks can also be employed.

Agent 306 attempts to execute the requested actions, such as by decrypting <encrypted password> and using it to create a new database password. Agent 306 also provides the status of the requested actions to control platform 118 at 610. For example, the agent can report that a credential was successfully added, updated, or failed to be added/updated. In some embodiments, if no response is received within a threshold time period, additional action is taken by control platform 118, such as a second doorbell being sent to agent 306. In other embodiments, if no response is received in the appropriate amount of time, the status is designated as a failure.

Finally, at 612, the status of the requests is provided as output. FIG. 7 illustrates an embodiment of an interface to control platform 118 as rendered in a browser. Interface 700 is presented to Alice after she presses button 510. As indicated at 702 and 704, the addition of new credentials to domain 304 was successful. The updating of the database password of the first database server has not yet completed (706). Specifically, the first database has not yet collected its action requests from control platform 118.

Morning Paper

In some embodiments, the credentials received from control platform 118 are, once decrypted, stored as they would typically be found on a traditional server not implementing the techniques described herein (e.g., including in the clear, and/or in the traditional location where the credentials would be located). In other embodiments, the received credentials are stored in a more secure location (e.g., by creating symbolic links, using include files, or using other applicable redirection techniques) and/or are decrypted as needed. For example, credentials can be stored on USB dongle 312 or stored in encrypted form on domain 304 and decrypted as needed by agent 306.

In yet other embodiments, at least some of the credentials provided to virtual domain 304 are stored in RAM 308 (e.g., in ramfs or other ram-based filesystem). When virtual domain 304 is rebooted, those credentials stored in RAM will be erased and thus need to be reprovisioned. One way of reprovisioning the credentials is as follows. System agent 306 is configured, upon reboot, to send a request to control platform 118 for all credential information associated with domain 304. This request is also referred to herein as a "morning paper" request. As with the request made by agent 306 in conjunction with portion 608 of the process shown in FIG. 6, the morning paper request is signed by the private key of domain 304 (which is stored in TPM 310, USB dongle 312, or otherwise not purged during reboot).

Additional checks can also be performed by control platform 118 at this point, including interrogating TPM 310 or USB dongle 312, requesting a list of installed packages, or requesting checksums of data stored in domain 304. Such checks can also be periodically performed, not in connection with the request, e.g., to ensure that domain 304 hasn't been tampered with and/or for use in later audits. Results of the checks are stored in database 314. Other types of policies can also be applied to the request, such as by limiting a given domain to one morning paper request per day; requiring an administrator to approve the request (e.g., out of band); requiring a physical presence detection routine be run on TPM 310 or dongle 312; or by generating an alert on console 108 when a morning paper request occurs. If the checks are successful, control platform 118 provides all of domain 304's credentials (as they appear in database 314—encrypted with domain 304's public key) to domain 304. If the checks are unsuccessful, a variety of actions can be taken. For example, an administrator can be alerted, either via consoles 108/110 or other communication methods (such as an email).

In various embodiments, database 314 serves as a cache of credential information. In the event credential information needed by domain 304 is not present in database 314, control platform 118 facilitates obtaining the credential information from the customer. For example, control platform 118 can alert Bob that he needs to supply credential information via configuration console 110, or via a secured application on his mobile telephony device.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
    a memory coupled to a processor to provide the processor with instructions; and
    the processor configured to execute the instructions to perform the following:
        send a first request to a control platform to add a virtual domain on behalf of a customer;
        receive from the control platform a domain key associated with the virtual domain; and
        send a second request to the control platform that configuration information encrypted using the domain key and associated with the second request that includes an indication of a value of an application credential provided by the customer that is one of a password, an SSH key, and an SSL certificate that is to be used in configuring the virtual domain, to cause the control platform to:
            notify the virtual domain that at least one action request associated with the virtual domain is available, wherein the action request includes at least one of adding the application credential provided by the customer and updating the application credential provided by the customer,
            receive a signed request from the virtual domain for the action request, and
            transmit the application credential provided by the customer to the virtual domain.

2. The system of claim 1 wherein the second request includes a request that the application credential be added to the virtual domain.

3. The system of claim 1 wherein the second request includes a request that an existing credential on the virtual domain be updated with the application credential.

4. The system of claim 1 wherein the processor is further configured to receive a status of the second request.

5. The system of claim 1 wherein the second request is signed by the customer.

6. A system, comprising:
    a memory coupled to a processor and configured to provide the processor with instructions; and
    the processor configured to execute the instructions to perform the following:
        receive, from a configuration console a request that one or more user-provided application credentials be pushed to a virtual domain;
        in response to receiving the request that the one or more user-provided application credentials be pushed to the virtual domain, notify the virtual domain that at least one action request associated with the virtual domain is available, wherein the action request includes at least one of adding a new credential and updating an existing credential;
        receive a signed request from the virtual domain for the action request; and
        transmit the user-provided application credentials to the virtual domain, wherein the virtual domain is configured at least in part by using the user-provided application credentials.

7. The system of claim 6 wherein the request received from the configuration console includes the one or more application credentials, encrypted with a domain key associated with the virtual domain.

8. The system of claim 6 wherein the processor is further configured to cache a copy of the one or more credentials, encrypted with a domain key associated with the virtual domain.

9. The system of claim 6 wherein the processor is further configured to receive from the virtual domain a status associated with the action requests.

10. The system of claim 6 wherein the processor is further configured to provide as output a status associated with the action requests.

11. The system of claim 10 wherein the status includes a proof that the action requests were successful.

12. The system of claim 6 wherein the processor is further configured to cause storage of the request received from the configuration console.

13. A system, comprising:
    a memory coupled to a processor and configured to provide the processor with instructions; and the processor configured to execute the instructions to perform the following:

receive, from a control platform, a notification that at least one action request associated with a virtual domain is available, wherein the action request includes at least one of adding an application credential of the virtual domain and updating an existing application credential of the virtual domain;

transmit a signed request to the control platform for the action request, wherein the control platform is configured to facilitate information distribution; and receive from the control platform a signed message including an encrypted application credential, wherein the encrypted application credential is a user-provided application credential that is one of a password, an SSH key, and an SSL certificate that is to be used in configuring the virtual domain, and wherein the user-provided application credential is encrypted with a domain key associated with the virtual domain.

14. The system of claim 13 wherein the processor is further configured to decrypt the encrypted application credential.

15. The system of claim 13 wherein the processor is further configured to store the credential in RAM.

16. The system of claim 13 wherein the processor is further configured to generate the domain key.

17. The system of claim 13 wherein the processor is configured to receive the domain key from a hardware module.

18. The system of claim 13 wherein, upon reboot, the processor is configured to reprovision the application credential from the control platform.

19. The system of claim 13 wherein the processor is further configured to periodically poll the control platform for new messages.

* * * * *